US009066362B2

(12) United States Patent
Chakravarthy et al.

(10) Patent No.: US 9,066,362 B2
(45) Date of Patent: Jun. 23, 2015

(54) PRIORITIZING TIME CRITICAL DATA FOR TRANSMISSION DURING POWER LIMITED STATE IN DC-HSUPA OPERATION (71) Applicant: QUALCOMM Incorporated, San Diego, CA (US)

(72) Inventors: Chetan Gopalakrishnan Chakravarthy, San Diego, CA (US); Arvindhan Kumar, San Diego, CA (US); Luna Sapna D'Souza, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 93 days.

(21) Appl. No.: 14/057,699

(22) Filed: Oct. 18, 2013

(65) Prior Publication Data

US 2014/0254505 A1 Sep. 11, 2014

Related U.S. Application Data (60) Provisional application No. 61/774,880, filed on Mar. 8, 2013.

(51) Int. Cl.
*H04W 4/00* (2009.01)
*H04L 12/28* (2006.01)
(Continued)

(52) U.S. Cl.
CPC .......... *H04W 72/10* (2013.01); *H04W 52/0216* (2013.01); *H04W 52/0222* (2013.01)

(58) Field of Classification Search
CPC ................... H04W 52/0216; H04W 52/0222; H04W 52/0277; H04W 52/16; H04W 52/34; H04W 52/146; H04W 52/286; H04W 52/346; H04W 52/325; H04W 52/327; H04W 72/10; H04W 72/0413; H04W 72/1242; H04W 72/1268; H04W 72/1278; H04W 72/1284; H04W 88/06; H04L 1/1887; H04L 5/0053; H04L 5/0064; H04L 5/0046; H04L 5/0094; H04L 47/24
USPC ......... 370/235–240, 249–252, 310–350, 431, 370/437, 464–465; 455/13.4, 127.1, 127.5, 455/522, 571, 574
See application file for complete search history.

(56) References Cited

U.S. PATENT DOCUMENTS 7,843,875 B2 11/2010 Somasundaram et al.
8,270,376 B2 9/2012 Dahlman et al.
(Continued)

FOREIGN PATENT DOCUMENTS

GB 2496733 A 5/2013
WO WO-2013/160681 A1 10/2013

OTHER PUBLICATIONS

International Search Report and Written Opinion—PCT/US2014/019096—ISA/EPO—Jun. 6, 2014, (10 total pages).

*Primary Examiner* — Tri H Phan
(74) *Attorney, Agent, or Firm* — Arent Fox LLP (57) ABSTRACT Techniques for prioritizing time critical data for transmission during a power-limited state in DC-HSUPA operation are described. A user equipment (UE) may be in a power-limited state. The UE may identify non-scheduled, time critical data and scheduled data as available for transmission. The UE may detect that a minimum transport block size is about to be selected for a transmission on a secondary uplink carrier. The UE may prioritize the non-scheduled, time critical data over the scheduled data and transmit the non-scheduled, time critical data on a primary uplink carrier based on the prioritizing. The UE also may transmit the scheduled data during a transmission time interval (TTI) that is different from the TTI during which the non-scheduled, time critical data was transmitted. The non-scheduled, time critical data and the scheduled data may be transmitted using transmit diversity.

30 Claims, 7 Drawing Sheets (51) Int. Cl.
*H04J 3/16* (2006.01)
*H04B 7/185* (2006.01)
*H04B 7/00* (2006.01)
*H04W 72/10* (2009.01)
*H04W 52/02* (2009.01)

(56) References Cited

U.S. PATENT DOCUMENTS

| | | | |
|---|---|---|---|
| 8,295,779 | B2 | 10/2012 | Cave et al. |
| 8,358,614 | B2 * | 1/2013 | Pani et al. .................... 370/328 |
| 8,457,056 | B2 * | 6/2013 | Zhang et al. .................. 370/329 |
| 2006/0223465 | A1 | 10/2006 | Akiba et al. |
| 2009/0196194 | A1 | 8/2009 | Paloheimo et al. |
| 2010/0113004 | A1 * | 5/2010 | Cave et al. ................. 455/422.1 |
| 2012/0093011 | A1 | 4/2012 | Ranta-Aho et al. |
| 2012/0113831 | A1 * | 5/2012 | Pelletier et al. .............. 370/252 |
| 2012/0207179 | A1 | 8/2012 | Ree |
| 2013/0176953 | A1 * | 7/2013 | Stern-Berkowitz et al. .. 370/329 |
| 2013/0194945 | A1 * | 8/2013 | Kanamarlapudi et al. .... 370/252 |
| 2014/0037019 | A1 * | 2/2014 | Akkarakaran et al. ........ 375/267 |
| 2014/0078985 | A1 * | 3/2014 | Kanamarlapudi et al. .... 370/329 |

* cited by examiner

PRIORITIZING TIME CRITICAL DATA FOR TRANSMISSION DURING POWER LIMITED STATE IN DC-HSUPA OPERATION

CLAIM OF PRIORITY UNDER 35 U.S.C. §119

The present Application for Patent claims priority to Provisional Application No. 61/774,880 entitled "PRIORITIZING TIME CRITICAL DATA FOR TRANSMISSION DURING POWER LIMITED STATE IN DC-HSUPA OPERATION" filed Mar. 8, 2013 and assigned to the assignee hereof and hereby expressly incorporated by reference herein.

BACKGROUND

The described aspects relate generally to wireless communication systems. More particularly, the described aspects relate to prioritizing time critical data for transmission during a power-limited state in DC-HSUPA operation.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. Furthermore, UMTS supports multiple radio access bearer (multi-RAB) capability, which allows simultaneous network communication with a user equipment (UE) over two or more radio access bearers. Therefore, in an aspect, multi-RAB functionality in UMTS allows for a UE to concurrently transmit and receive packet-switched (PS) and circuit-switched (CS) data.

A UE may operate in Dual Cell (or Dual Carrier) High Speed Uplink Packet Access (DC-HSUPA), or simply Dual Carrier Uplink (UL), mode in W-CDMA. As such, a UE operating in DC-HSUPA may be able to transmit data on two uplink (UL) carriers: a primary uplink carrier and a secondary uplink carrier. If such a UE is in a power-limited state (e.g., the UE is using its maximum power such that it does not have enough power available to build a transport block having even the smallest size possible), the UE can rely on a minimum set Enhanced Dedicated Channel (E-DCH) Transport Format Combination Indicator (E-TFCI), which also may be referred to as a MIN SET E-TFCI (which is described in the 3GPP specifications), provided and/or specified by the network to transmit critical data even if the UE is in a power-limited state. E-TFCI may inform a receiver (e.g., a UE) of a transport block size coded on Enhanced Dedicated Physical Data Channels (E-DPDCH). From this information, the receiver may determine how many E-DPDCHs are transmitted in parallel and a spreading factor. As such, information provided by the MIN SET E-TFCI may be a predefined transport block size (e.g., a predefined amount of data) that may be used by a UE to transmit data during a power-limited state.

In some instances, there may be non-scheduled Signaling Radio Bearer (SRB) data, which includes time critical information, stored along with scheduled Packet Switched (PS) data available in a Layer 2 (L2) buffer. Layer 2 includes a Medium Access Control (MAC) layer that performs E-TFCI selection on an UL carrier.

Generally, when a UE operating in DC-HSUPA is in a power-limited state, which may be determined by Layer 2, E-TFCI selection may first be performed for transmission via a secondary UL carrier, followed by E-TFCI selection for transmission via a primary UL carrier. In the case of the non-scheduled, time critical SRB data waiting in the L2 buffer (along with scheduled PS data), and when the UE is in a power-limited state, there may not be enough power headroom for transmission of the non-scheduled, time critical SRB data on the primary UL carrier during the current transmission time interval (TTI). As such, any attempted transmission of the non-scheduled, time critical SRB data may fail in the current TTI, and potentially later TTIs as well, causing a delay in transmission of the time critical data.

As such, improvements in transmission of time critical data when a UE is in a power-limited state may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for prioritizing time critical data for transmission by a user equipment (UE) is described. The method may include determining that the user equipment is in a power-limited state. The method may include identifying non-scheduled, time critical data and scheduled data as available for transmission. The method may include detecting that a minimum transport block size is about to be selected for a transmission on a secondary uplink carrier. The method may include prioritizing the non-scheduled, time critical data over the scheduled data based on the detecting. The method may include transmitting the non-scheduled, time critical data on a primary uplink carrier based on the prioritizing.

In an aspect, an apparatus for prioritizing time critical data for transmission at a user equipment (UE) is described. The apparatus may include means for determining that the user equipment is in a power-limited state. The apparatus may include means for identifying non-scheduled, time critical data and scheduled data as available for transmission. The apparatus may include means for detecting that a minimum transport block size is about to be selected for a transmission on a secondary uplink carrier. The apparatus may include means for prioritizing the non-scheduled, time critical data over the scheduled data. The apparatus may include means for transmitting the non-scheduled, time critical data on a primary uplink carrier based on the prioritizing.

In an aspect, a non-transitory computer-readable medium for prioritizing time critical data for transmission at a user equipment (UE) is described. The computer-readable medium may include code. When executed by a processor or processing system included within the user equipment, the code may cause the user equipment to determine that the user equipment is in a power-limited state. When executed by a processor or processing system included within the user equipment, the code may cause the user equipment to identify non-scheduled, time critical data and scheduled data as available for transmission. When executed by a processor or processing system included within the user equipment, the code may cause the user equipment to detect that a minimum transport block size is about to be selected for a transmission on a secondary uplink carrier. When executed by a processor or processing system included within the user equipment, the code may cause the user equipment to prioritize the non-scheduled, time critical data over the scheduled data. When executed by a processor or processing system included within the user equipment, the code may cause the user equipment to transmit the non-scheduled, time critical data on a primary uplink carrier based on the prioritizing.

In an aspect, an apparatus for prioritizing time critical data for transmission at a user equipment (UE) is described. The apparatus may include a power-limited state determination component configured to determine that the user equipment is in a power-limited state. The apparatus may include a transmitter component configured to identify non-scheduled, time critical data and scheduled data as available for transmission. The apparatus may include a time critical data prioritization component configured to detect that a minimum transport block size is about to be selected for a transmission on a secondary uplink carrier, and prioritize the non-scheduled, time critical data over the scheduled data. The transmitter component may be further configured to transmit the non-scheduled, time critical data on a primary uplink carrier based on the prioritizing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

A user equipment (UE) operating in Dual Cell (or Dual Carrier) High Speed Uplink Packet Access (DC-HSUPA) mode in W-CDMA may be configured to transmit data on two uplink (UL) carriers: a primary uplink carrier and a secondary uplink carrier. While transmitting data, the UE may find that it has used a large amount of its available power. In such a scenario, there may not be enough power left in the power headroom of the UE (e.g., total power available to the UE minus power being used for current transmissions) to build a transport block of even a smallest size possible (or available) to transmit any additional data. As such, the UE may be referred to as being in a power-limited state.

There may be instances when time critical data, though not scheduled, may need to be transmitted by the UE. In an example, non-scheduled, time critical data may be Signaling Radio Bearer (SRB) data. Such non-scheduled data may be stored alongside scheduled data in a Layer 2 (L2) buffer. In an example, the scheduled data may be Packet Switched (PS) data.

If a UE is in a power-limited state and there is also non-scheduled, time critical data to be transmitted, the UE may rely on a fixed transport block provided or specified by the network to transmit the non-scheduled, time critical data despite the UE being in the power-limited state. The fixed (or minimum) transport block, which may be indicated by a minimum set Enhanced Dedicated Channel (E-DCH) Transport Format Combination Indicator (E-TFCI), which also may be referred to as a MIN SET E-TFCI (described in a standard or specification, such as, for example, those provided by 3GPP), may be used by the UE to transmit the non-scheduled, time critical data using whatever (very small amount of) power headroom is still available at the UE. Currently, in such a scenario, MIN SET E-TFCI allows for the non-scheduled, time critical data to be transmitted on a primary uplink carrier when a UE is operating in DC-HSUPA. At the same time, the UE may try to send the buffered scheduled data on the secondary uplink carrier as per a usual functionality of the UE. However, because the UE is already in a power-limited state, there is a high probability that the transmission of the non-scheduled, time critical data on the primary uplink carrier and/or the transmission of the scheduled data on the secondary uplink carrier may be delayed, or may fail completely.

Instead, and according to the present aspects, a UE may prioritize the non-scheduled, time critical data. To do so, and in one example, the UE may stop or stall transmission of the scheduled data on the secondary uplink carrier so that the total remaining power headroom may be used to transmit the non-scheduled, time critical data on the primary uplink carrier using the minimum transport block size indicated by the MIN SET E-TFCI. As such, the non-scheduled, time critical data may be transmitted successfully and quickly so that it arrives safely and within an acceptable time frame.

Figure 1:
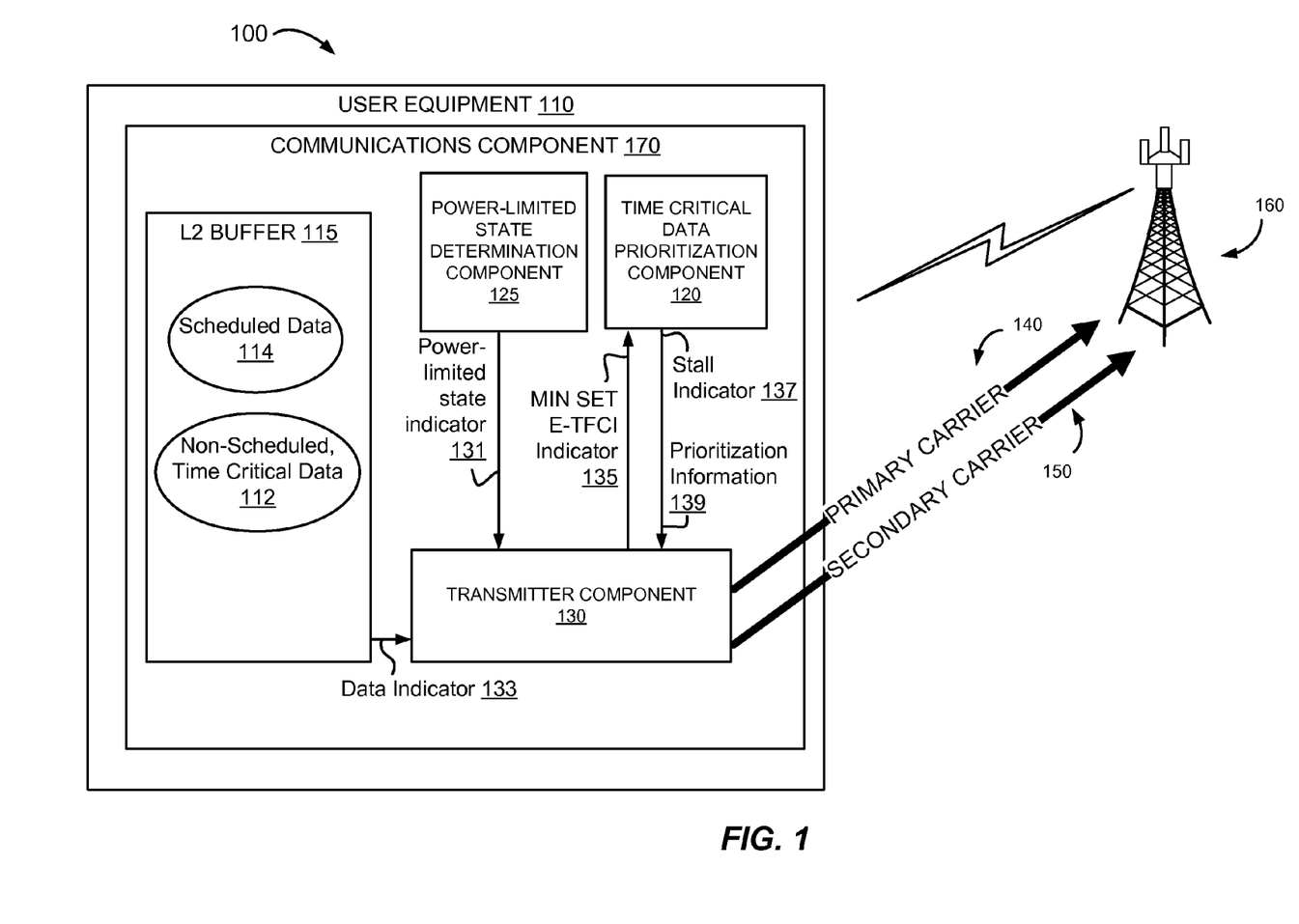
FIG. 1 is a block diagram illustrating a wireless communication system in which a user equipment is in communication with a base station, having aspects configured to prioritize time critical data for transmission during a power-limited state.

Referring to FIG. 1, a wireless communication system 100 includes a user equipment (UE) 110 having one or more components configured for prioritizing time critical data for transmission to a base station 160 during a power-limited state when the UE 110 is operating according to DC-HSUPA. By operating in DC-HSUPA, UE 110 may be able to transmit data on two uplink (UL) carriers: a primary uplink carrier 140 and a secondary uplink carrier 150.

In some aspects, UE 110 also may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Base station 160, which also may be referred to as an access point or node, may be a macrocell, picocell, femtocell, relay, Node B, mobile Node B, UE (e.g., communicating in peer-to-peer or ad-hoc mode with UE 110), or substantially any type of component that can communicate with UE 110 to provide wireless network access.

UE 110 may include communications component 170 configured to handle communications between UE 110 and base station 160. Communications component 170 may include L2 buffer 115, which may be configured to store both scheduled data 114 and non-scheduled, time critical data 112. In an example, non-scheduled, time critical data 112 may be SRB data and scheduled data 114 may be PS data.

Communications component 170 also may include power-limited state determination component 125 configured to determine if UE 110 is in a power-limited state. A UE may be in a power-limited state if the UE is currently using a large amount of its available power such that there may not be enough power left in the power headroom of the UE (e.g., total power available to the UE minus power being used for current transmissions) to build a transport block of even a smallest size possible (or available) to transmit any additional data. Further, power-limited state determination component 125 may be configured to communicate a power-limited state indicator 131 to transmitter component 130 to indicate that it has determined that UE 110 is in a power-limited state.

Communications component 170 may include transmitter component 130, which may be configured to receive power-limited state indicator 131 from power-limited state determination component 125. In an aspect, and non-limiting example, transmitter component 130 also may be configured to receive data indicator 133 from L2 buffer 115, which indicates that non-scheduled, time critical data 112 is available for transmission (along with scheduled data 114). In another aspect and non-limiting example, transmitter component 130 may receive the non-scheduled, time critical data 112 (and scheduled data 114) from L2 buffer 115 (not shown) when the data is ready for transmission. As UE 110 is in a power-limited state, transmitter component 130 may be configured to select a minimum transport block size, identified by MIN SET E-TFCI and specified by a network, to transmit the non-scheduled, time critical data 112 on a carrier (e.g., secondary uplink carrier 150). At the same time, for example, transmitter component 130 may be configured to transmit scheduled data 114 on a carrier (e.g., primary uplink carrier 140) as per a usual functionality.

Communications component 170 also may include time critical data prioritization component 120, which may be configured to determine that a minimum transport block size (e.g., according to a network-specified MIN SET E-TFCI) is about to be selected by transmitter component 130 for a transmission on secondary uplink carrier 150. In an aspect, and one, non-limiting example, time critical data prioritization component 120 may be configured to monitor communications between L2 buffer 115 and transmitter component 130 and/or processes performed by transmitter component 130 (not shown) in order to detect that the minimum transport block size is about to be selected by transmitter component 130 to transmit non-scheduled, time critical data 112 on secondary uplink carrier 150. In an aspect, and another, non-limiting example, transmitter component 130 may be configured to receive an MIN SET E-TFCI indicator 135 from transmitter component 130 and, based thereon, detect that the transmitter component 130 is about to select, and utilize, a minimum transport block size to transmit non-scheduled, time critical data 112 on secondary uplink carrier 150.

Based on this detection, time critical data prioritization component 120 may be configured to notify transmitter component 130 to stop or stall any transmissions using the minimum transport block size (e.g., transmissions of non-scheduled, time critical data 112) until further notice. Also based on the detection, time critical data prioritization component 120 may be configured to notify transmitter component 130 to stop or stall all transmissions of scheduled data 114, also until further notice and/or at least during the current transmission time interview (TTI) (e.g., the TTI during which non-scheduled, time critical data 112 may be transmitted, if it is prioritized). Time critical data prioritization component 120 may provide both notifications to transmitter component 130 via stall indicator 137, which may be a single communication or multiple communications.

To help militate against delayed or failed transmission of non-scheduled, time critical data 112, time critical data prioritization component 120 may prioritize the non-scheduled, time critical data 112 over scheduled data 114. For example, based on detecting that the minimum transport block size is about to be selected by transmitter component 130 and, as such, non-scheduled, time critical data 112 would be transmitted on secondary uplink carrier 150 (and, perhaps, be delayed and/or fail to arrive in a timely manner), time critical data prioritization component 120 may determine that non-scheduled, time critical data 112 should be transmitted (via transmitter component 130) in a way that will help ensure timely and complete transmission of non-scheduled, time critical data 112 even, for example, at the expense (e.g., by causing a delay or transmission failure) of transmission of scheduled data 114.

Once time critical data prioritization component 120 has determined to prioritize non-scheduled, time critical data 112, time critical data prioritization component 120 may be configured to communicate prioritization information 139 to transmitter component 130, to indicate that transmitter component 130 is to transmit non-scheduled, time critical data 112 with priority (e.g., over scheduled data 114).

In response to receiving prioritization information 139 from time critical data prioritization component 120, transmitter component 130 may be configured to transmit the non-scheduled, time critical data 112 (e.g., using the minimum transport block) on the primary uplink carrier 140 rather than secondary uplink carrier 150. Transmitter component 130 further may be configured to stall or stop transmission of the scheduled data 114 on any carrier while the non-scheduled, time critical data 112 is being transmitted on the primary uplink carrier during a transmission time interval (TTI). In an aspect, transmitter component 130 further may be configured to send the scheduled data 114 on a carrier (e.g., either primary uplink carrier 140 or secondary uplink carrier 150)

during a TTI that is different from, and/or subsequent to, the TTI used for transmission of the non-scheduled, time critical data 112.

In an aspect, communications component 170, L2 buffer 115, time-critical data prioritization component 120, and/or power-limited state determination component 125, transmitter component 130 may be hardware components physically included within UE 110. In another aspect, communications component 170, L2 buffer 115, time-critical data prioritization component 120, and/or power-limited state determination component 125, transmitter component 130 may be software components (e.g., software modules), such that the functionality described with respect to each of the modules may be performed by a specially-configured computer, processor (or group of processors), and/or a processing system (e.g., processor 304 of FIG. 3), included within UE 110, executing one or more of the modules. Further, and in an aspect where the modules of UE 110 are software modules, the software modules may be downloaded to UE 110 from, e.g., a server or other network entity, retrieved from a memory or other data store internal to UE 110 (e.g., computer-readable medium 306 of FIG. 3), and/or accessed via an external computer-readable medium (e.g., a CD-ROM, flash drive, and/or the like).

Figure 2:
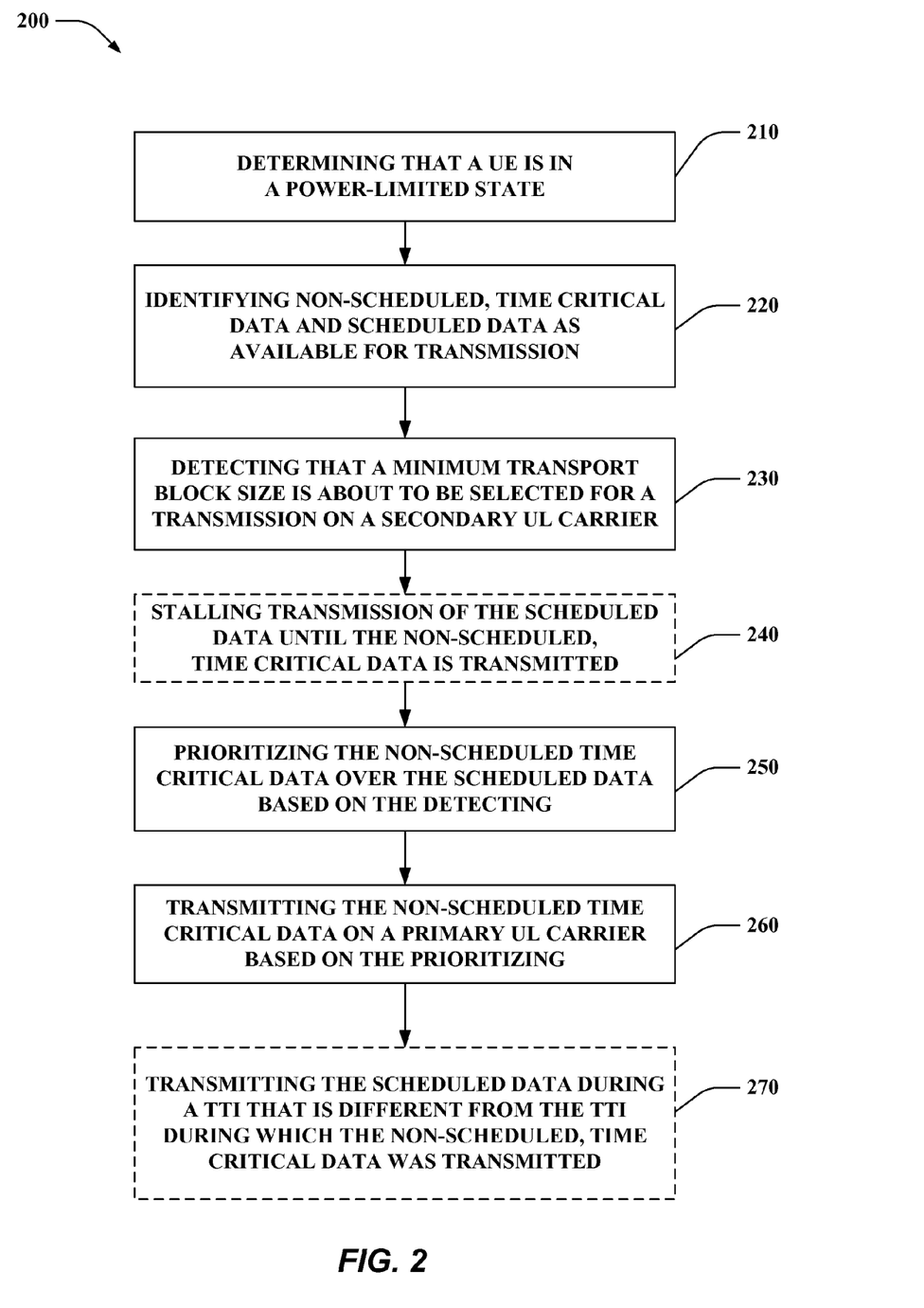
FIG. 2 is a flow chart of aspects of a method for prioritizing time critical data for transmission during a power-limited state.

Referring to FIG. 2, aspects of a method 200 for prioritizing time critical data for transmission during a power-limited state may be performed by UE 110 of FIG. 1. In an aspect, UE 110 performs aspects of method 200 when operating according to DC-HSUPA. More particularly, aspects of method 200 may be performed by communications component 170, L2 buffer 115, power-limited state determination component 125, time critical data prioritization component 120, and/or transmitter component 130.

At 210, the method 200 includes determining that a UE is in a power-limited state. For example, power-limited state determination component 125 may determine that the UE 110 is in a power-limited state. In an aspect, power-limited state determination component 125 may determine that UE 110 is in a power-limited state by determining that UE 110 does not have enough power to build a transport block having a smallest size possible. In other words, a UE may be in a power-limited state if the UE is currently using a large amount of its available power such that there may not be enough power left in the UE's power headroom (e.g., total power available to the UE minus power being used for current transmissions) to build a transport block of even a smallest size possible (or available) to transmit any additional data At 220, method 200 includes identifying that non-scheduled, time critical data and scheduled data are both available for transmission. For example, L2 buffer 115, in which non-scheduled, time critical data 112 and scheduled data 114 are stored, may provide data indicator 133 to transmitter component 130 to indicate that non-scheduled, time critical data 112 and scheduled data 114 are both available for transmission. In response, and in an aspect, transmitter component 130 may retrieve non-scheduled, time critical data 112 and scheduled data 114 from L2 buffer 115. In another aspect (not shown in FIG. 1), L2 buffer 115 may communicate non-scheduled, time critical data 112 and scheduled data 114 to transmitter component 130 to indicate that such data is available for transmission. In an example, non-scheduled, time critical data 112 may be SRB data and scheduled data 114 may be PS data.

At 230, method 200 includes detecting that a minimum transport block size is about to be selected for a transmission on a secondary uplink carrier. For example, time critical data prioritization component 120 may be configured to detect that a minimum transport block size, as indicated by the network via MIN SET E-TFCI, is about to be selected for use by transmitter component 130 to send non-scheduled, time critical data 112 on secondary uplink carrier 150. In an aspect, time critical data prioritization component 120 may do so by monitoring communications to and from, and/or processes performed by, transmitter component 130. In another aspect, time critical data prioritization component 120 may receive a MIN SET E-TFCI indicator 135 from transmitter component 130 when transmitter component 1301 about to select a minimum transport block size as described herein.

Optionally, at 240, method 200 may include based on the detecting, stalling transmission of the scheduled data until the non-scheduled, time critical data is transmitted. In an aspect, in response to detecting that transmitter component 130 is about to select a minimum transport block size, time critical data prioritization component 120 may be configured to inform transmitter component 130 to, first stop and/or stall any transmissions of scheduled data 114, and, second, stop and/or stall building the minimum transport block for transmission of the non-scheduled, time critical data 112 on secondary uplink carrier 150 and/or stall any such transmissions using the minimum transport block size, until further notice and/or during the current TTI. Time critical data prioritization component 120 may do so by communicating stall indicator 137 to transmitter component 130.

At 250, method 200 includes prioritizing the non-scheduled, time critical data based on the detecting. For example, in response to detecting that transmitter component 130 is about to select a minimum transport block size, time critical data prioritization component 120 may prioritize the non-scheduled, time critical data 112 (e.g., over scheduled data 114). In an aspect, time critical data prioritization component 120 may prioritize non-scheduled, time critical data 112 at the expense (e.g., by delaying and/or failing to transmit) the scheduled data 114 according to a usual approach. Based on the prioritization, time critical data prioritization component 120 may provide prioritization information 139 to transmitter component 130 to indicate that non-scheduled, time critical data 112 is to be transmitted with priority over scheduled data 114.

At 260, method 200 includes transmitting the non-scheduled, time critical data on a primary UL carrier. For example, in response to the communication from time critical data prioritization component 120, transmitter component 130 may transmit non-scheduled, time critical data 112 on primary uplink carrier 140. In an aspect, transmitter component 130 may transmit the non-scheduled, time critical data 112 using a fixed transport block size (e.g., indicated by MIN SET E-TFCI) specified by a network. In an aspect, transmitting using a fixed transport block size specified by the network may include transmitting using some, or all, of the remaining power headroom at the user equipment.

Optionally at 270, method 200 includes transmitting the scheduled data on either one of the primary or secondary UL carriers during a TTI that is different from the TTI during which the non-scheduled, time critical data was transmitted. For example, transmitter component 130 may be configured to transmit the scheduled data 114 on primary uplink carrier 140 or secondary uplink carrier 150 during a different and/or subsequent TTI. In an aspect, transmitting the non-scheduled, time critical data 112 may include transmitting with transmit diversity on both the primary uplink carrier 140 and the secondary uplink carrier 150.

Figure 3:
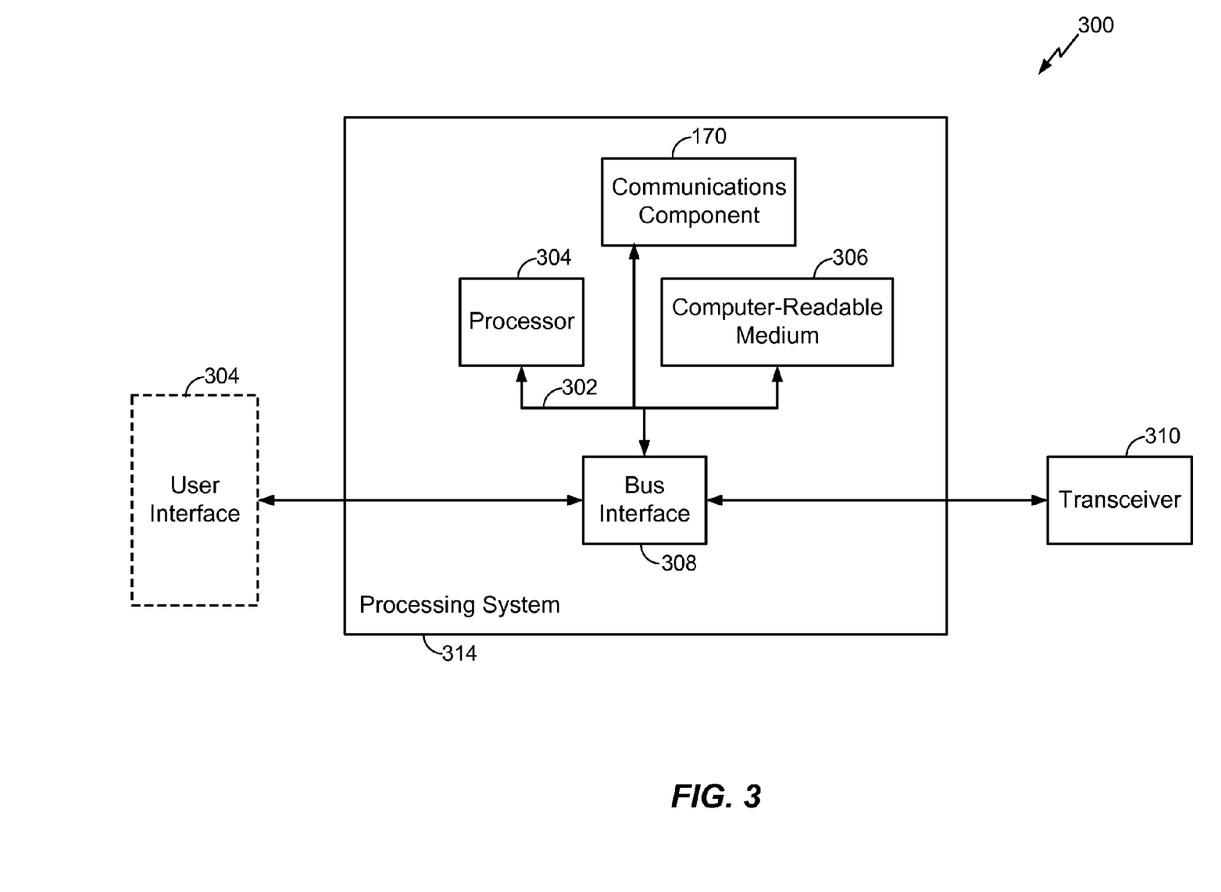
FIG. 3 is a block diagram illustrating an example of a hardware implementation for an apparatus employing a processing system having aspects configured to prioritize time critical data for transmission during a power-limited state.

Referring to FIG. 3, an example of a hardware implementation for an apparatus 300 employing a processing system 314 having aspects configured to prioritize time critical data for transmission during a power-limited state. In an aspect, apparatus 300 may be UE 110 of FIG. 1, including communications component 170, which itself includes L2 buffer 115, power-limited state determination component 125, time critical data prioritization component 120 and transmitter component 130.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors, represented generally by the processor 304, one or more communications components, such as, for example, communications component 170 of FIG. 1, and computer-readable media, represented generally by the computer-readable medium 306. The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described herein for any particular apparatus. More particularly, and as described above with respect to FIG. 1, communications component 170, L2 buffer 115, time critical data prioritization component 120, power-limited state determination component 125, and/or transmitter component 130 may be software components (e.g., software modules), such that the functionality described with respect to each of the modules may be performed by processor 304.

The computer-readable medium 306 may also be used for storing data that is manipulated by the processor 304 when executing software, such as, for example, software modules represented by communications component 170, L2 buffer 115, time critical data prioritization component 120, power-limited state determination component 125, and/or transmitter component 130. In one example, the software modules (e.g., any algorithms or functions that may be executed by processor 304 to perform the described functionality) and/or data used therewith (e.g., inputs, parameters, variables, and/or the like) may be retrieved from computer-readable medium 306.

More particularly, the processing system further includes at least one of communications component 170, L2 buffer 115, time critical data prioritization component 120, power-limited state determination component 125, and/or transmitter component 13. The modules may be software modules running in the processor 304, resident and/or stored in the computer-readable medium 306, one or more hardware modules coupled to the processor 304, or some combination thereof.

Figure 4:
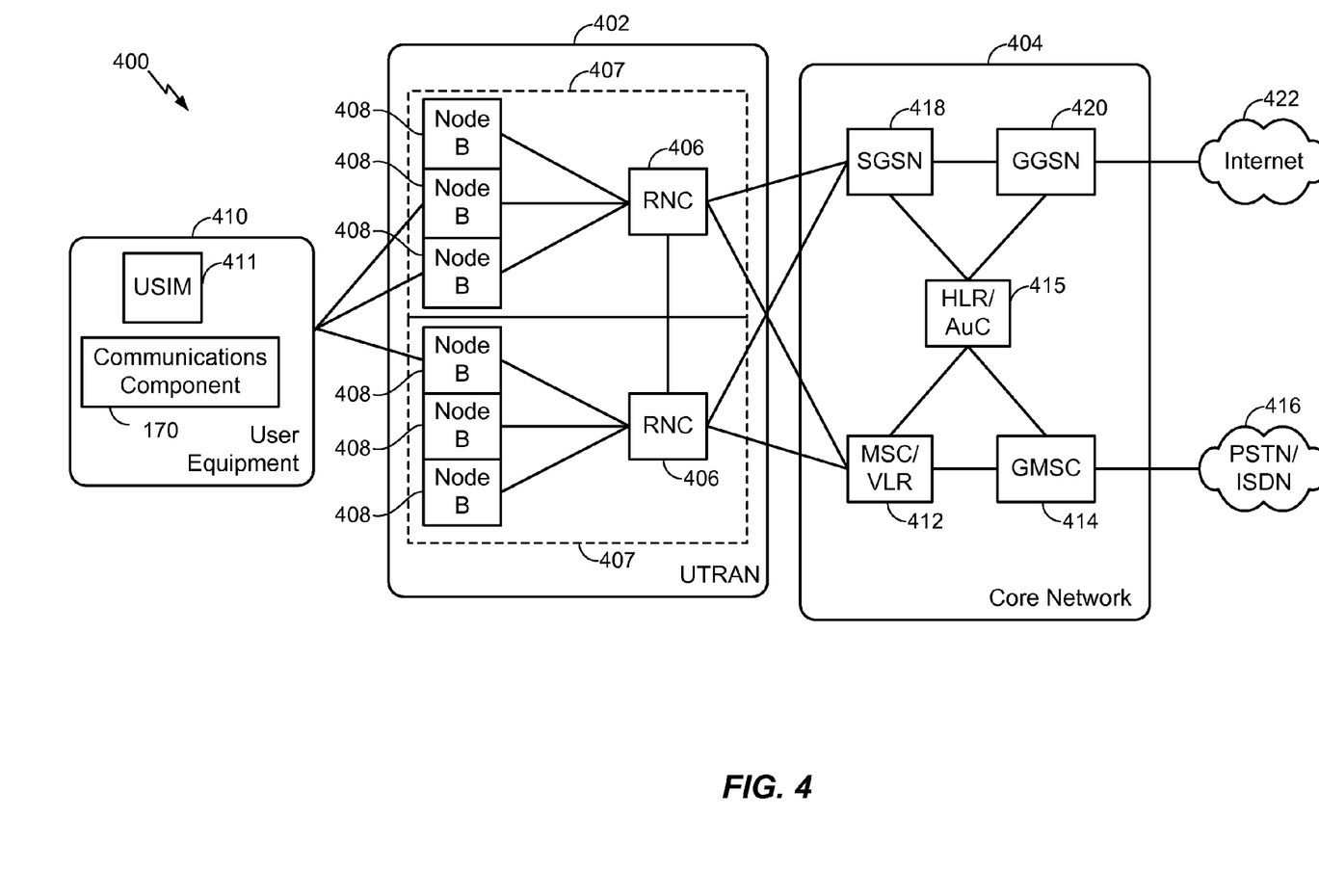
FIG. 4 is a block diagram illustrating an example of a telecommunications system having aspects configured to prioritize time critical data for transmission during a power-limited state.

The various concepts presented throughout this disclosure may be implemented across a broad variety of telecommunication systems, network architectures, and communication standards. By way of example and without limitation, the aspects of the present disclosure illustrated in FIG. 4 are presented with reference to a UMTS system 400 employing a W-CDMA air interface and having aspects configured to prioritize time critical data for transmission during a power-limited state. A UMTS network includes three interacting domains: a Core Network (CN) 404, a UMTS Terrestrial Radio Access Network (UTRAN) 402, and User Equipment (UE) 410. In an aspect, UE 410 may be UE 110 of FIG. 1, including communications component 170. In this example, the UTRAN 402 provides various wireless services including telephony, video, data, messaging, broadcasts, and/or other services. The UTRAN 402 may include a plurality of Radio Network Subsystems (RNSs) such as an RNS 407, each controlled by a respective Radio Network Controller (RNC) such as an RNC 406. Here, the UTRAN 402 may include any number of RNCs 406 and RNSs 407 in addition to the RNCs 406 and RNSs 407 illustrated herein. The RNC 406 is an apparatus responsible for, among other things, assigning, reconfiguring and releasing radio resources within the RNS 407. The RNC 406 may be interconnected to other RNCs (not shown) in the UTRAN 402 through various types of interfaces such as a direct physical connection, a virtual network, or the like, using any suitable transport network.

Communication between a UE 410 and a Node B 408, which may be base station 160 of FIG. 1, may be considered as including a physical (PHY) layer and a medium access control (MAC) layer. Further, communication between a UE 410 and an RNC 406 by way of a respective Node B 408 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 25.331 v9.1.0, incorporated herein by reference.

The geographic region covered by the RNS 407 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 408 are shown in each RNS 407; however, the RNSs 407 may include any number of wireless Node Bs. The Node Bs 408 provide wireless access points to a CN 404 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 410 may further include a universal subscriber identity module (USIM) 411, which contains a user's subscription information to a network. For illustrative purposes, one UE 410 is shown in communication with a number of the Node Bs 408. The DL, also called the forward link, refers to the communication link from a Node B 408 to a UE 410, and the UL, also called the reverse link, refers to the communication link from a UE 410 to a Node B 408.

The CN 404 interfaces with one or more access networks, such as the UTRAN 402. As shown, the CN 404 is a GSM core network. However, as those skilled in the art will recognize, the various concepts presented throughout this disclosure may be implemented in a RAN, or other suitable access network, to provide UEs with access to types of CNs other than GSM networks.

The CN 404 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 404 supports circuit-switched services with a MSC 412 and a GMSC 414. In some applications, the GMSC 414 may be referred to as a media gateway (MGW). One or more RNCs, such as the RNC 406, may be connected to the MSC 412. The MSC 412 is an apparatus that controls call setup, call routing, and UE mobility functions. The MSC 412 also includes a VLR that contains subscriber-related information for the duration that a UE is in the coverage area of the MSC 412. The GMSC 414 provides a gateway through the MSC 412 for the UE to access a circuit-switched network 416. The GMSC 414 includes a home location register (HLR) 415 containing subscriber data, such as the data reflecting the details of the services to which a particular user has subscribed. The HLR is also associated with an authentication center (AuC) that contains subscriber-specific authentication data. When a call is received for a particular UE, the GMSC 414 queries the HLR 415 to determine the UE's location and forwards the call to the particular MSC serving that location.

The CN 404 also supports packet-data services with a serving GPRS support node (SGSN) 418 and a gateway GPRS support node (GGSN) 420. GPRS, which stands for General Packet Radio Service, is designed to provide packet-data services at speeds higher than those available with standard circuit-switched data services. The GGSN 420 provides a connection for the UTRAN 402 to a packet-based network 422. The packet-based network 422 may be the Internet, a private data network, or some other suitable packet-based network. The primary function of the GGSN 420 is to provide the UEs 410 with packet-based network connectivity. Data packets may be transferred between the GGSN 420 and the UEs 410 through the SGSN 418, which performs primarily the same functions in the packet-based domain as the MSC 412 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 408 and a UE 410. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 410 provides feedback to the Node B 408 over the HS-DPCCH to indicate whether it correctly decoded a packet on the downlink.

HS-DPCCH further includes feedback signaling from the UE 410 to assist the Node B 408 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the Node B 408 and/or the UE 410 may have multiple antennas supporting MIMO technology. The use of MIMO technology enables the Node B 408 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 410 to increase the data rate or to multiple UEs 410 to increase the overall system capacity. This is achieved by spatially precoding each data stream and then transmitting each spatially precoded stream through a different transmit antenna on the downlink. The spatially precoded data streams arrive at the UE(s) 410 with different spatial signatures, which enables each of the UE(s) 410 to recover the one or more the data streams destined for that UE 410. On the uplink, each UE 410 may transmit one or more spatially precoded data streams, which enables the Node B 408 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 5:
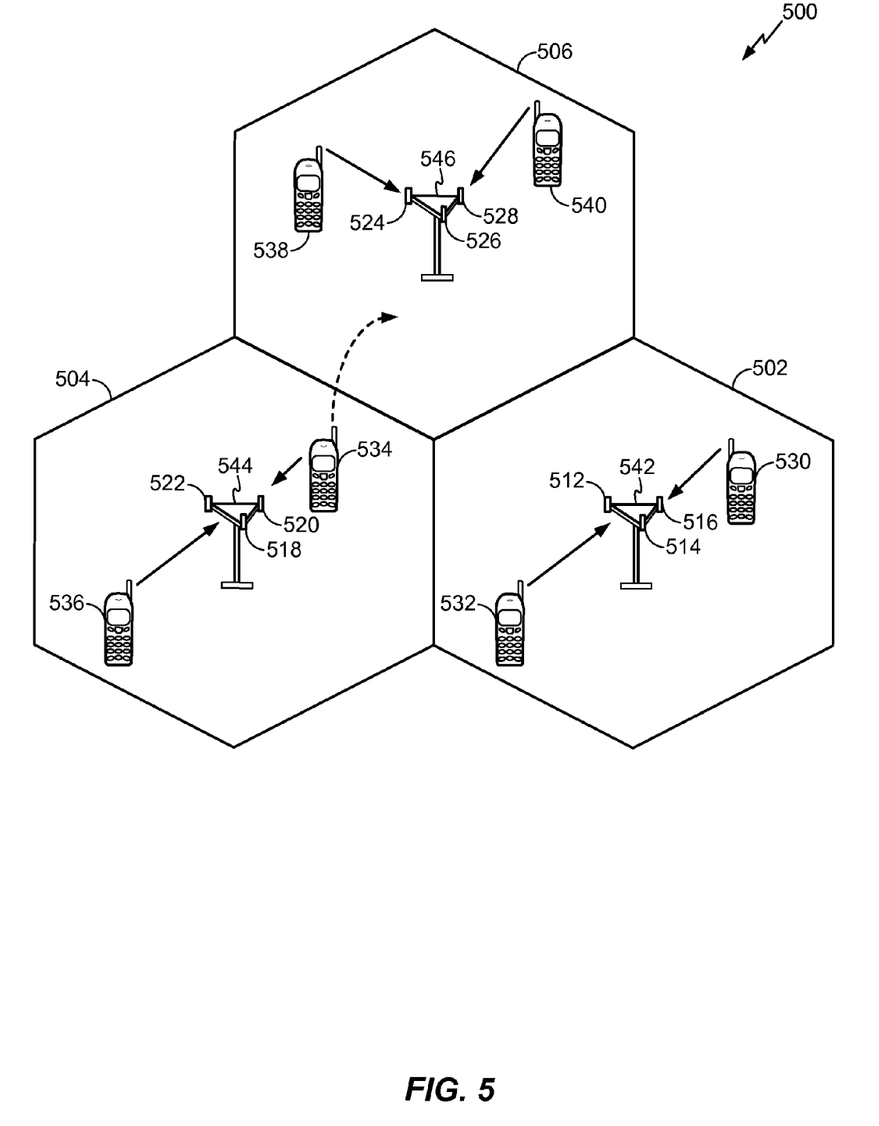
FIG. 5 is a block diagram illustrating an example of an access network having aspects configured to prioritize time critical data for transmission during a power-limited state.

Referring to FIG. 5, an access network 500 is in a UTRAN architecture having aspects configured to prioritize time critical data for transmission during a power-limited state. The multiple access wireless communication system includes multiple cellular regions (cells), including cells 502, 504, and 506, each of which may include one or more sectors. The multiple sectors can be formed by groups of antennas with each antenna responsible for communication with UEs in a portion of the cell. For example, in cell 502, antenna groups 512, 514, and 516 may each correspond to a different sector. In cell 504, antenna groups 518, 520, and 522 each correspond to a different sector. In cell 506, antenna groups 524, 526, and 528 each correspond to a different sector. The cells 502, 504 and 506 may include several wireless communication devices, e.g., User Equipment or UEs, which may be in communication with one or more sectors of each cell 502, 504 or 506. For example, UEs 530 and 532 may be in communication with Node B 542, UEs 534 and 536 may be in communication with Node B 544, and UEs 538 and 540 can be in communication with Node B 546. In an aspect, one of UEs 530, 532, 534, 536, 538, and/or 540 may be UE 110 of FIG. 1. Here, each Node B 542, 544, and 546 is configured to provide an access point to a CN 404 (see FIG. 4) for all the UEs 530, 532, 534, 536, 538, 540 in the respective cells 502, 504, and 506. In an aspect, Node Bs 542, 544, and 546 may be base station 160 of FIG. 1.

As the UE 534 moves from the illustrated location in cell 504 into cell 506, a serving cell change (SCC) or handover may occur in which communication with the UE 534 transitions from the cell 504, which may be referred to as the source cell, to cell 506, which may be referred to as the target cell. Management of the handover procedure may take place at the UE 534, at the Node Bs corresponding to the respective cells, at a radio network controller 406 (see FIG. 4), or at another suitable node in the wireless network. For example, during a call with the source cell 504, or at any other time, the UE 534 may monitor various parameters of the source cell 504 as well as various parameters of neighboring cells such as cells 506 and 502. Further, depending on the quality of these parameters, the UE 534 may maintain communication with one or more of the neighboring cells. During this time, the UE 534 may maintain an Active Set, that is, a list of cells that the UE 534 is simultaneously connected to (i.e., the UTRA cells that are currently assigning a downlink dedicated physical channel DPCH or fractional downlink dedicated physical channel F-DPCH to the UE 534 may constitute the Active Set).

The modulation and multiple access scheme employed by the access network 500 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 6.

Figure 6:
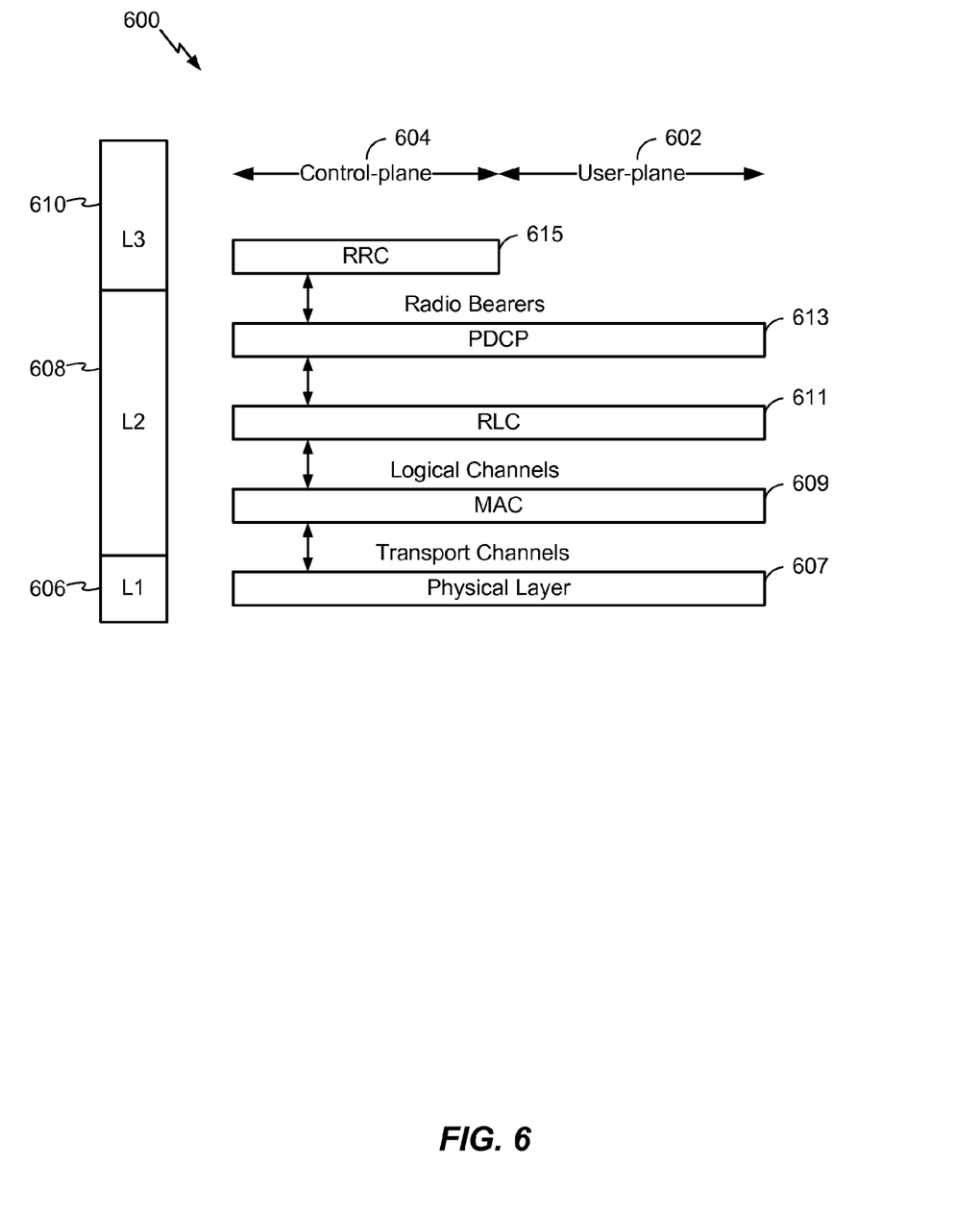
FIG. 6 is a block diagram illustrating an example of a radio protocol architecture for user and control planes.

Referring to FIG. 6, an example radio protocol architecture 600 relates to the user plane 602 and the control plane 604 of a user equipment (UE) or Node B/base station in communication with one another and having aspects configured to prioritize time critical data for transmission during a power-limited state. In an aspect, architecture 600 may be included in a UE such as UE 110 of FIG. 1. In an aspect, architecture 600 may be included in a base station, such as base station 160 of FIG. 1. The radio protocol architecture 600 for the UE and Node B is shown with three layers: Layer 1 606, Layer 2 608, and Layer 3 610. Layer 1 606 is the lowest lower and implements various physical layer signal processing functions. As such, Layer 1 606 includes the physical layer 607. Layer 2 (L2 layer) 608 is above the physical layer 607 and is responsible for the link between the UE and Node B over the physical layer 607. Layer 3 (L3 layer) 610 includes a radio resource control (RRC) sublayer 615. The RRC sublayer 615 handles the control plane signaling of Layer 3 between the UE and the UTRAN.

In the user plane, the L2 layer 608 includes a media access control (MAC) sublayer 609, a radio link control (RLC) sublayer 611, and a packet data convergence protocol (PDCP) 613 sublayer, which are terminated at the Node B on the network side. Although not shown, the UE may have several upper layers above the L2 layer 608 including a network layer (e.g., IP layer) that is terminated at a PDN gateway on the network side, and an application layer that is terminated at the other end of the connection (e.g., far end UE, server, etc.).

The PDCP sublayer 613 provides multiplexing between different radio bearers and logical channels. The PDCP sublayer 613 also provides header compression for upper layer data packets to reduce radio transmission overhead, security by ciphering the data packets, and handover support for UEs between Node Bs. The RLC sublayer 611 provides segmentation and reassembly of upper layer data packets, retransmission of lost data packets, and reordering of data packets to compensate for out-of-order reception due to hybrid automatic repeat request (HARQ). The MAC sublayer 609 provides multiplexing between logical and transport channels. The MAC sublayer 609 is also responsible for allocating the various radio resources (e.g., resource blocks) in one cell among the UEs. The MAC sublayer 609 is also responsible for HARQ operations.

Figure 7:
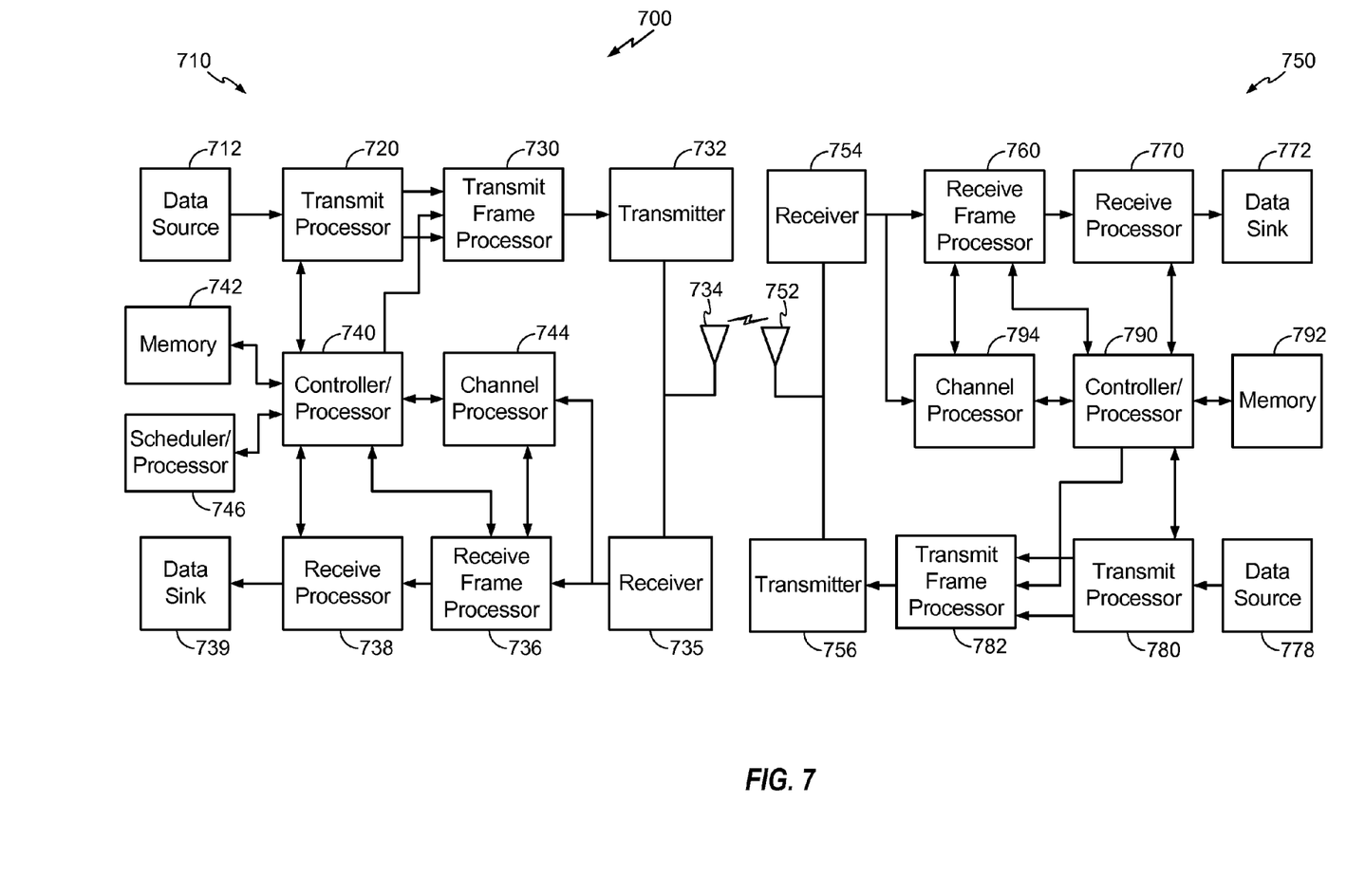
FIG. 7 is a block diagram illustrating an example of a base station (e.g., Node B) in communication with a user equipment in a telecommunications system having aspects configured to prioritize time critical data for transmission during a power-limited state.

Referring to FIG. 7, a Node B 710 is in communication with a UE 750 and having aspects configured to prioritize time critical data for transmission during a power-limited state. In an aspect, the Node B 710 may be the Node B 408 in FIG. 4 and/or base station 160 of FIG. 1. In an aspect, the UE 550 may be the UE 410 in FIG. 4 and/or UE 110 of FIG. 1. In the downlink communication, a transmit processor 720 may receive data from a data source 712 and control signals from a controller/processor 740. The transmit processor 720 provides various signal processing functions for the data and control signals, as well as reference signals (e.g., pilot signals). For example, the transmit processor 720 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 744 may be used by a controller/processor 740 to determine the coding, modulation, spreading, and/or scrambling schemes for the transmit processor 720. These channel estimates may be derived from a reference signal transmitted by the UE 750 or from feedback from the UE 750. The symbols generated by the transmit processor 720 are provided to a transmit frame processor 730 to create a frame structure. The transmit frame processor 730 creates this frame structure by multiplexing the symbols with information from the controller/processor 740, resulting in a series of frames. The frames are then provided to a transmitter 732, which provides various signal conditioning functions including amplifying, filtering, and modulating the frames onto a carrier for downlink transmission over the wireless medium through antenna 734. The antenna 734 may include one or more antennas, for example, including beam steering bidirectional adaptive antenna arrays or other similar beam technologies.

At the UE 750, a receiver 754 receives the downlink transmission through an antenna 752 and processes the transmission to recover the information modulated onto the carrier. The information recovered by the receiver 754 is provided to a receive frame processor 760, which parses each frame, and provides information from the frames to a channel processor 794 and the data, control, and reference signals to a receive processor 770. The receive processor 770 then performs the inverse of the processing performed by the transmit processor 720 in the Node B 710. More specifically, the receive processor 770 descrambles and despreads the symbols, and then determines the most likely signal constellation points transmitted by the Node B 710 based on the modulation scheme. These soft decisions may be based on channel estimates computed by the channel processor 794. The soft decisions are then decoded and deinterleaved to recover the data, control, and reference signals. The CRC codes are then checked to determine whether the frames were successfully decoded. The data carried by the successfully decoded frames will then be provided to a data sink 772, which represents applications running in the UE 750 and/or various user interfaces (e.g., display). Control signals carried by successfully decoded frames will be provided to a controller/processor 790. When frames are unsuccessfully decoded by the receiver processor 770, the controller/processor 790 may also use an acknowledgement (ACK) and/or negative acknowledgement (NACK) protocol to support retransmission requests for those frames.

In the uplink, data from a data source 778 and control signals from the controller/processor 790 are provided to a transmit processor 780. The data source 778 may represent applications running in the UE 750 and various user interfaces (e.g., keyboard). Similar to the functionality described in connection with the downlink transmission by the Node B 710, the transmit processor 780 provides various signal processing functions including CRC codes, coding and interleaving to facilitate FEC, mapping to signal constellations, spreading with OVSFs, and scrambling to produce a series of symbols. Channel estimates, derived by the channel processor 794 from a reference signal transmitted by the Node B 710 or from feedback contained in the midamble transmitted by the Node B 710, may be used to select the appropriate coding, modulation, spreading, and/or scrambling schemes. The symbols produced by the transmit processor 780 will be provided to a transmit frame processor 782 to create a frame structure. The transmit frame processor 782 creates this frame structure by multiplexing the symbols with information from the controller/processor 790, resulting in a series of frames. The frames are then provided to a transmitter 756, which provides various signal conditioning functions including amplification, filtering, and modulating the frames onto a carrier for uplink transmission over the wireless medium through the antenna 752.

The uplink transmission is processed at the Node B 710 in a manner similar to that described in connection with the receiver function at the UE 750. A receiver 735 receives the uplink transmission through the antenna 734 and processes the transmission to recover the information modulated onto the carrier. The information recovered by the receiver 735 is provided to a receive frame processor 736, which parses each frame, and provides information from the frames to the channel processor 744 and the data, control, and reference signals to a receive processor 738. The receive processor 738 performs the inverse of the processing performed by the transmit processor 780 in the UE 750. The data and control signals carried by the successfully decoded frames may then be provided to a data sink 739 and the controller/processor, respectively. If some of the frames were unsuccessfully decoded by the receive processor, the controller/processor 740 may also use an acknowledgement (ACK) and/or negative acknowledgement (NACK) protocol to support retransmission requests for those frames.

The controller/processors 740 and 790 may be used to direct the operation at the Node B 710 and the UE 750, respectively. For example, the controller/processors 740 and 790 may provide various functions including timing, peripheral interfaces, voltage regulation, power management, and other control functions. The computer readable media of memories 742 and 792 may store data and software for the Node B 710 and the UE 750, respectively. A scheduler/processor 746 at the Node B 710 may be used to allocate resources to the UEs and schedule downlink and/or uplink transmissions for the UEs.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Several aspects of a telecommunications system have been presented with reference to a W-CDMA system. As those skilled in the art will readily appreciate, various aspects described throughout this disclosure may be extended to other telecommunication systems, network architectures and communication standards. By way of example, the techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for prioritizing time critical data for transmission by a user equipment (UE), comprising:
   determining that the user equipment is in a power-limited state;
   identifying non-scheduled, time critical data and scheduled data as available for transmission;
   detecting that a minimum transport block size is about to be selected for a transmission on a secondary uplink carrier;
   prioritizing the non-scheduled, time critical data over the scheduled data based on the detecting; and
   transmitting the non-scheduled, time critical data on a primary uplink carrier based on the prioritizing.

2. The method of claim 1, wherein the prioritizing comprises determining to transmit the non-scheduled, time critical data at the expense of the scheduled data.

3. The method of claim 1, further comprising stalling, based on the detecting, transmission of the scheduled data until the non-scheduled, time critical data is transmitted.

4. The method of claim 1, wherein transmitting the non-scheduled, time critical data comprises transmitting using a fixed transport block size specified by a network as a MIN SET E-TFCI.

5. The method of claim 4, wherein transmitting using the fixed transport block size specified by the network comprises transmitting using at least some of any remaining power headroom at the user equipment.

6. The method of claim 1, further comprising transmitting the scheduled data.

7. The method of claim 6, wherein transmitting the scheduled data comprises transmitting the scheduled data during a transmission time interval that is different from the transmission time interval during which the non-scheduled, time critical data was transmitted.

8. The method of claim 1, wherein transmitting the non-scheduled, time critical data comprises transmitting the non-scheduled, time critical data with transmit diversity on both the primary uplink carrier and the secondary uplink carrier.

9. An apparatus for prioritizing time critical data for transmission at a user equipment (UE), comprising:
   means for determining that the user equipment is in a power-limited state;
   means for identifying non-scheduled, time critical data and scheduled data as available for transmission;
   means for detecting that a minimum transport block size is about to be selected for a transmission on a secondary uplink carrier;
   means for prioritizing the non-scheduled, time critical data over the scheduled data; and
   means for transmitting the non-scheduled, time critical data on a primary uplink carrier based on the prioritizing.

10. The apparatus of claim 9, wherein the means for prioritizing comprises means for determining to transmit the non-scheduled, time critical data at the expense of the scheduled data.

11. The apparatus of claim 9, further comprising means for stalling, based on the detecting, transmission of the scheduled data until the non-scheduled, time critical data is transmitted.

12. The apparatus of claim 9, wherein the means for transmitting the non-scheduled, time critical data comprises means for transmitting using a fixed transport block size, specified by a network as a MIN SET E-TFCI, using at least some of any remaining power headroom at the user equipment.

13. The apparatus of claim 9, further comprising transmitting the scheduled data during a transmission time interval that is different from the transmission time interval during which the non-scheduled, time critical data was transmitted.

14. The apparatus of claim 9, wherein transmitting the non-scheduled, time critical data comprises transmitting the non-scheduled, time critical data with transmit diversity on both the primary uplink carrier and the secondary uplink carrier.

15. A non-transitory computer-readable medium for prioritizing time critical data for transmission at a user equipment (UE) comprising code that, when executed by a processor or processing system included within the user equipment, causes the user equipment to:
   determine that the user equipment is in a power-limited state;
   identify non-scheduled, time critical data and scheduled data as available for transmission;
   detect that a minimum transport block size is about to be selected for a transmission on a secondary uplink carrier;
   prioritize the non-scheduled, time critical data over the scheduled data; and
   transmit the non-scheduled, time critical data on a primary uplink carrier based on the prioritizing.

16. The non-transitory computer-readable medium of claim 15, wherein the code that causes the user equipment to prioritize further comprises code for causing the user equipment to transmit the non-scheduled, time critical data at the expense of the scheduled data.

17. The non-transitory computer-readable medium of claim 15, further comprising code that causes the user equipment to stall, based on the detecting, transmission of the scheduled data until the non-scheduled, time critical data is transmitted.

18. The non-transitory computer-readable medium of claim 15, wherein the code that causes the user equipment to transmit the non-scheduled, time critical data further comprises code that causes the user equipment to transmit using a fixed transport block size, specified by a network as a MIN SET E-TFCI, using at least some of any remaining power headroom at the user equipment.

19. The non-transitory computer-readable medium of claim 15, further comprising code that causes the user equipment to transmit the scheduled data during a transmission time interval that is different from the transmission time interval during which the non-scheduled, time critical data was transmitted.

20. The non-transitory computer-readable medium of claim 15, wherein the code that causes the user equipment to transmit the non-scheduled, time critical data further comprises code that causes the user equipment to transmit the non-scheduled, time critical data with transmit diversity on both the primary uplink carrier and the secondary uplink carrier.

21. An apparatus for prioritizing time critical data for transmission at a user equipment (UE), comprising:
   a power-limited state determination component configured to determine that the user equipment is in a power-limited state;
   a transmitter component configured to identify non-scheduled, time critical data and scheduled data as available for transmission; and
   a time critical data prioritization component configured to:
      detect that a minimum transport block size is about to be selected for a transmission on a secondary uplink carrier, and
      prioritize the non-scheduled, time critical data over the scheduled data,
   wherein the transmitter component is further configured to transmit the non-scheduled, time critical data on a primary uplink carrier based on the prioritizing.

22. The apparatus of claim 21, wherein the power-limited state determination component being configured to determine that the user equipment is in the power-limited state comprises the power-limited state determination component further configured to determine that the user equipment does not have enough power to build a transport block having a smallest size possible or available.

23. The apparatus of claim 21, wherein the time critical data prioritization component being configured to prioritize comprises the time critical data prioritization component further configured to determine to transmit the non-scheduled, time critical data at the expense of the scheduled data.

24. The apparatus of claim 21, wherein the time critical data prioritization component is further configured to stall transmission of the scheduled data until the non-scheduled, time critical data is transmitted based on detecting that the minimum transport block size is about to be selected for a transmission on the secondary uplink carrier.

25. The apparatus of claim 21, wherein the transmitter component being configured to transmit the non-scheduled, time critical data comprises the transmitter component further configured to transmit using a fixed transport block size specified by a network.

26. The apparatus of claim 25, wherein the transmitter component being configured to transmit using the fixed transport block size specified by the network comprises the transmitter component further configured to transmit using at least some of any remaining power headroom at the user equipment.

27. The apparatus of claim 25, wherein the fixed transport block size specified by the network is indicated by a MIN SET E-TFCI.

28. The apparatus of claim 21, wherein the transmitter component is further configured to transmit the scheduled data.

29. The apparatus of claim 28, wherein the transmitter component being configured to transmit the scheduled data comprises the transmitter component further configured to transmit the scheduled data during a transmission time interval that is different from the transmission time interval during which the non-scheduled, time critical data was transmitted.

30. The apparatus of claim 21, wherein the transmitter component being configured to transmit the non-scheduled, time critical data comprises the transmitter component further configured to transmit with transmit diversity on both the primary uplink carrier and the secondary uplink carrier.

* * * * *